(12) United States Patent
Tao et al.

(10) Patent No.: US 12,310,496 B2
(45) Date of Patent: May 27, 2025

(54) AUDIOVISUAL DEVICE RACK

(71) Applicant: NINGBO SOMLE AUDIO-VISUAL TECHNOLOGY CO., LTD, Ningbo (CN)

(72) Inventors: Liming Tao, Ningbo (CN); Weidong Chen, Ningbo (CN)

(73) Assignee: NINGBO SOMLE AUDIO-VISUAL TECHNOLOGY CO., LTD, Ningbo (CN)

( * ) Notice: Subject to any disclaimer, the term of this patent is extended or adjusted under 35 U.S.C. 154(b) by 57 days.

(21) Appl. No.: 18/334,016

(22) Filed: Jun. 13, 2023

(65) Prior Publication Data
US 2023/0320483 A1 Oct. 12, 2023

(30) Foreign Application Priority Data

Feb. 3, 2023 (CN) .......................... 202320243277.1

(51) Int. Cl.
*A47B 81/06* (2006.01)
*F16M 11/10* (2006.01)

(52) U.S. Cl.
CPC ......... *A47B 81/065* (2013.01); *F16M 11/105* (2013.01)

(58) Field of Classification Search
CPC .............................. A47B 1/065; F16M 11/105
See application file for complete search history.

(56) References Cited

U.S. PATENT DOCUMENTS

| | | | | |
|---|---|---|---|---|
| 5,918,841 A * | 7/1999 | Sweere | .............. | A47B 21/0314 248/281.11 |
| 6,347,433 B1 * | 2/2002 | Novin | .................... | F16M 11/10 16/342 |
| 6,905,101 B1 * | 6/2005 | Dittmer | .................. | F16M 11/10 248/125.7 |
| 7,195,213 B2 * | 3/2007 | Weatherly | ............ | A47B 81/061 248/125.1 |
| 7,621,544 B2 * | 11/2009 | Rossini | .................. | F16M 11/22 280/47.35 |
| 7,857,270 B2 * | 12/2010 | Short | .................... | F16M 11/041 248/286.1 |
| 8,191,487 B2 * | 6/2012 | Theesfeld | .............. | F16M 11/24 108/50.01 |
| 8,702,049 B2 * | 4/2014 | Vieira | .................. | F16M 11/041 248/245 |
| 10,149,542 B2 * | 12/2018 | Diekröger | .............. | F16M 11/42 |
| 10,619,788 B2 * | 4/2020 | Pei | ......... | F16M 11/12 |
| 11,421,815 B2 * | 8/2022 | Yamada | .............. | H05K 5/0204 |
| 12,055,265 B2 * | 8/2024 | Tucker | ................. | F16M 13/022 |
| 2004/0084578 A1 * | 5/2004 | Cho | .................... | F16M 11/2064 248/283.1 |
| 2007/0252919 A1 * | 11/2007 | McGreevy | ............. | F16M 11/28 348/825 |

(Continued)

*Primary Examiner* — Monica E Millner

(57) ABSTRACT

The disclosure provides an audiovisual device rack comprising a column, an adjustment member and a mounting plate, the mounting plate is connected to the column via the adjustment member, and the adjustment member is used to enable the mounting plate to be arranged swingable left and right relative to the column so as to rotate the adjustment member around a center of a circle of arc-shaped slots relative to the column to adjust an angle of an audiovisual device on the mounting plate.

12 Claims, 10 Drawing Sheets

(56) References Cited

U.S. PATENT DOCUMENTS

| | | | |
|---|---|---|---|
| 2011/0079688 A1* | 4/2011 | Grove | F16M 11/08 |
| | | | 248/176.3 |
| 2015/0211675 A1* | 7/2015 | Shyu | F16M 11/105 |
| | | | 248/125.7 |
| 2020/0000225 A1 | 1/2020 | Whalen et al. | |
| 2021/0247015 A1 | 8/2021 | Yamada | |
| 2022/0397229 A1 | 12/2022 | Massey | |

* cited by examiner

AUDIOVISUAL DEVICE RACK

TECHNICAL FIELD

The present invention pertains to the technical field of racks, and specifically pertains to an audiovisual device rack.

BACKGROUND

Computers and other audiovisual devices have now become indispensable auxiliary devices for offices, education, conferences, trade show displays, etc. In use, it is often necessary to turn the angle of the audiovisual device or switch back and forth between horizontal or vertical screens, most of the existing racks are not easy to adjust the horizontal and vertical screens of the audiovisual device, so that blind spots easily occur to the audiovisual device, and the content on the audiovisual device is not visible in certain directions, which in turn affects the effect of use.

SUMMARY

The purpose of the present invention is to provide an audiovisual device rack. It solves the problem that the content on the audiovisual device is not visible in certain directions, which in turn affects the effect of use.

As a first aspect of the present invention, an audiovisual device rack is provided, comprising a column, an adjusting member and a mounting plate, wherein the mounting plate is connected to the column via the adjusting member, the adjusting member comprises a connecting seat and two fixing plates respectively formed on one side and the opposite side of the connecting seat, the connecting seat is provided with arc-shaped slots, the column is provided with connectors, the connectors pass through the arc-shaped slots to be connected with the column so as to connect the connecting seat with the column, the mounting plate is arranged between the two fixing plates and is hingedly fixed to the adjusting member by a rotary rod connected between the two fixing plates, the adjusting member is rotatably arranged around a center of a circle of the arc-shaped slots relative to the column, and the mounting plate is rotatably arranged relative to the adjusting member with the rotary rod as a rotation axis.

In the scheme, the connecting seat is rotated, so that the adjusting member is rotated around the center of the circle of the arc-shaped slots relative to the column, an angle of an audiovisual device on the mounting plate is adjusted, and the angle of the audiovisual device can be changed freely and conveniently to switch between fixing or vertical screens, so that blind spots will not appear during use of the audiovisual device, and a user can clearly and conveniently see the content on the audiovisual device, producing good effect of use.

As a first aspect of the present invention, an audiovisual device rack is provided, comprising a base, a column having a lower end connected with the base, a mounting plate connected to the column, and a hook fixedly connected to a fixing rod on the mounting plate by means of a hook fixing structure, and the fixing rod is provided with a device connection portion for fixing an audiovisual device thereto. The fixing rod is further provided with a limiting portion, and the limiting portion is hinged to the fixing rod at one end; the limiting portion is in snap fit with or separated from a snap-on portion of the fixing rod at the other end; the end of the limiting portion in snap fit with or separated from the fixing rod is in snap fit with the snap-on portion to form a snap-in cavity therebetween, the snap-in cavity is used for the mounting plate to be snapped therein so that the fixing rod is fixedly connected to the mounting plate, and the end of the limiting portion in snap fit with or separated from the fixing rod is separated from the snap-on portion to open the snap-in cavity for the fixing rod to be released; and the end of the limiting portion in snap fit with or separated from the fixing rod is in snap fit with or separated from the snap-on portion on two adjacent surfaces of the mounting plate or at an abutting rib of the two surfaces, thus enabling quick and easy fixation, installation and removal of the audiovisual device.

Figure 1:
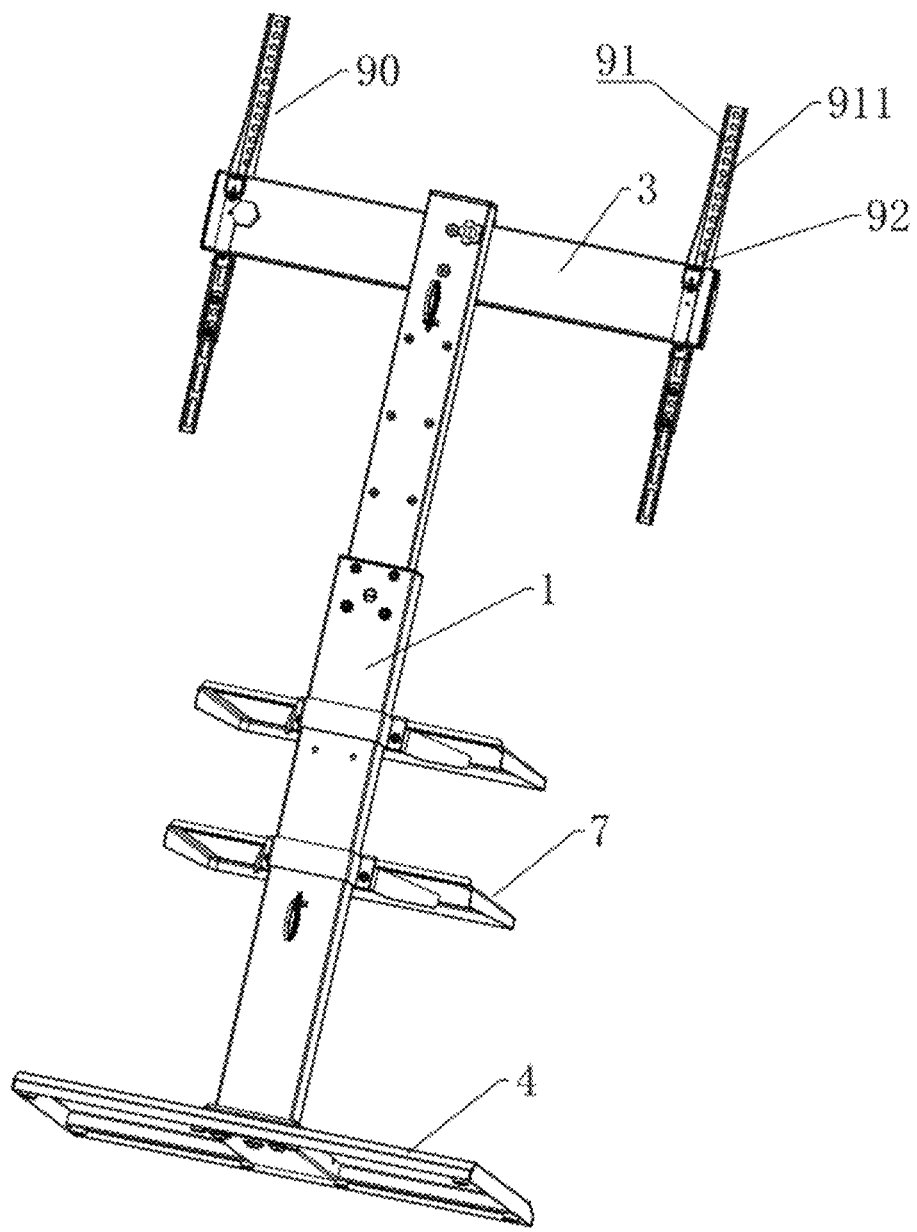
FIG. 1 is a schematic diagram of an overall structure of an audiovisual device rack according to an embodiment of the present invention.

REFERENCE NUMERALS IN THE DRAWINGS 1. column; 11. connector; 12. first column body; 121. third connecting hole; 13. second column body; 131. fourth connecting hole; 2. adjusting member; 21. connecting seat; 211. arc-shaped slot; 212. first connecting hole; 22. rotary rod; 23. fixing plate; 3. mounting plate; 4. base; 5. fixture; 6. clamping member; 61. snap-fit member; 611. connecting plate; 612. U-shaped clip; 7. placement table; 8. bolt; 90. hook; 91. fixing rod; 911. fixing surface; 912. bending portion; 92. snap-on portion; 921. mounting member; 94. limiting portion; 941. hinged portion; 942. connecting portion; 943. clamping portion; 95. connecting structure; 951. screw.

DESCRIPTION OF THE EMBODIMENTS

In order to make those skilled in the art better understand the present invention and thereby define the scope of the present invention more clearly, the present invention is described below in detail relative to some specific embodiments of the present invention. It should be noted that the following description only relates to some specific embodiments of the inventive concept and are only part of the embodiments of the present invention, specific and direct descriptions of relevant structures are merely for the convenience of understanding the present invention, and the specific features do not, of course, directly limit the implementation scope of the present invention. Conventional choices and alternatives made by those skilled in the art under the guidance of the inventive concept should be considered within the scope of the present invention.

Figure 2:
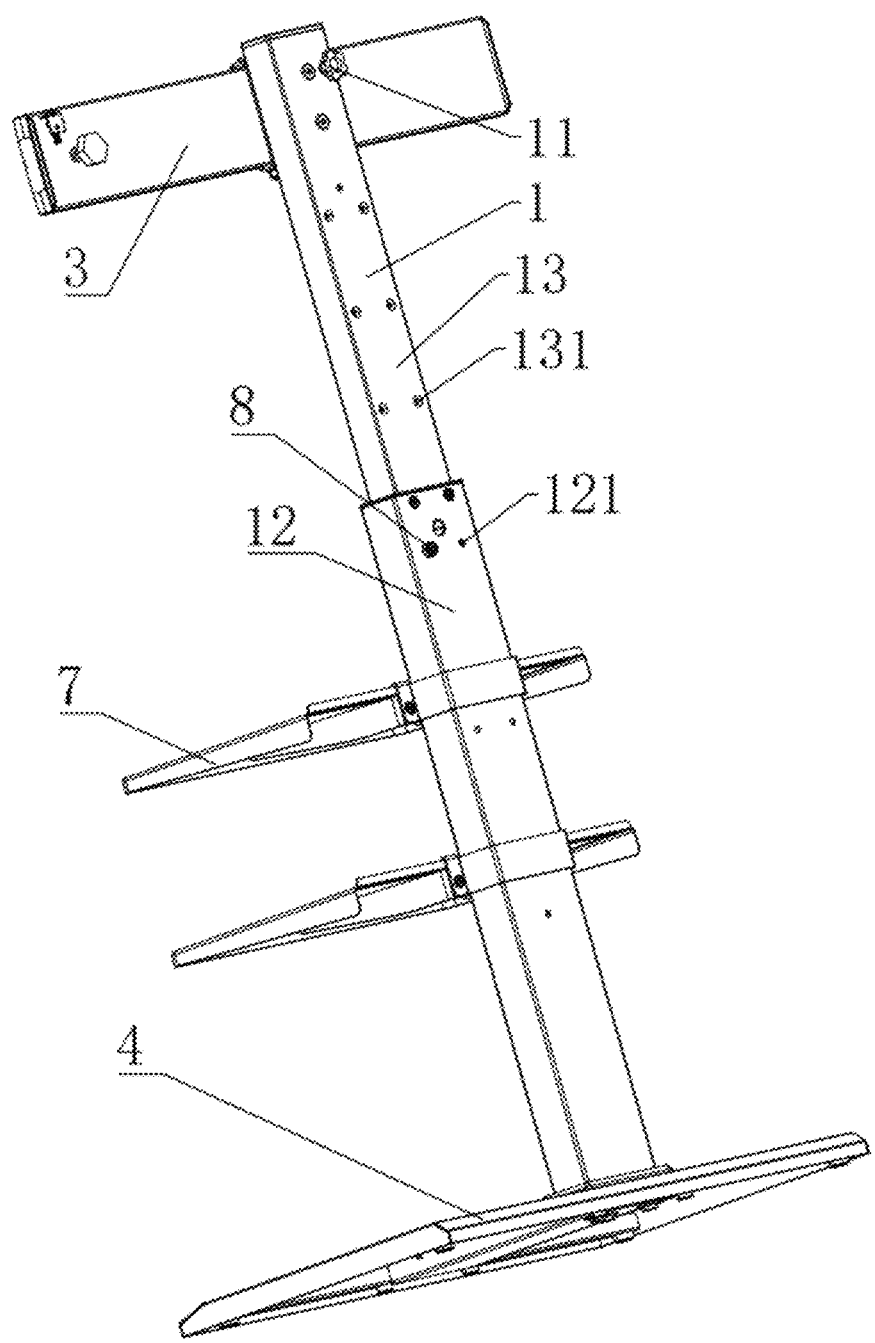
FIG. 2 is a schematic diagram of a main body structure in the embodiment of FIG. 1.

As shown in FIGS. 1-2, an audiovisual device rack, comprises a column 1, an adjusting member 2 and a mounting plate 3; the mounting plate 3 is connected to the column 1 via the adjusting member 2, the adjusting member 2 comprises a connecting seat 21 and two fixing plates 23 respectively formed on one side and the opposite side of the connecting seat 21, the connecting seat 21 is provided with arc-shaped slots 211, the column 1 is provided with connectors 11, the connectors 11 pass through the arc-shaped slots 211 to be connected with the column 1 so as to connect the connecting seat 21 with the column 1, the mounting plate 3 is arranged between the two fixing plates 23 and is hingedly fixed to the adjusting member 2 by a rotary rod 22 connected between the two fixing plates 23, the adjusting member 2 is rotatably arranged around a center of a circle of the arc-shaped slots 211 relative to the column 1, and the mounting plate 3 is rotatably arranged relative to the adjusting member 2 with the rotary rod 22 as a rotation axis.

In the present embodiment, the adjusting part 2 rotates relative to the column 1 according to an axis which is perpendicular to a bottom surface of the connecting seat 21 and passes through the center of the circle, the connecting seat 21 is rotated, so that the adjusting member 2 is rotated around the center of the circle of the arc-shaped slots 211 relative to the column 1, an angle of an audiovisual device on the mounting plate 3 is adjusted, and the angle of the audiovisual device can be changed freely and conveniently to switch between horizontal or vertical screens, so that blind spots will not appear during use of the audiovisual device, and a user can clearly and conveniently see the content on the audiovisual device, producing good effect of use.

Further, as a preferred embodiment, the connecting seat 21 is provided with a plurality of the arc-shaped slots 211 and the plurality of the arc-shaped slots 211 are on a same circle, and each of the arc-shaped slots 211 is provided with the connector 11. The plurality of arc-shaped slots 211 and the connectors 11 can make the rotation more synchronous and smooth and the connection firmer.

Figure 3:
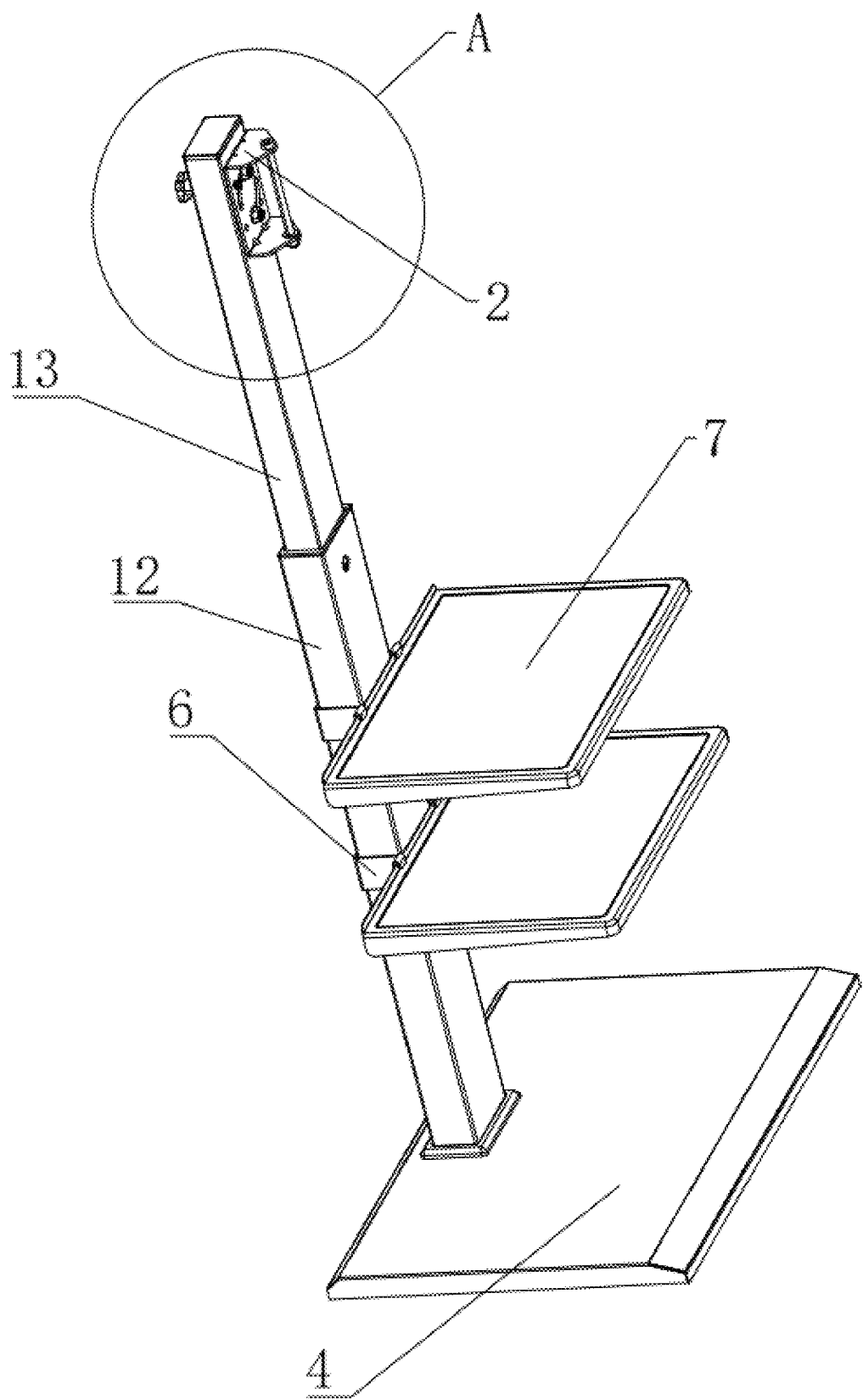
FIG. 3 is a structural schematic diagram of FIG. 2 with a mounting plate removed.
Figure 4:
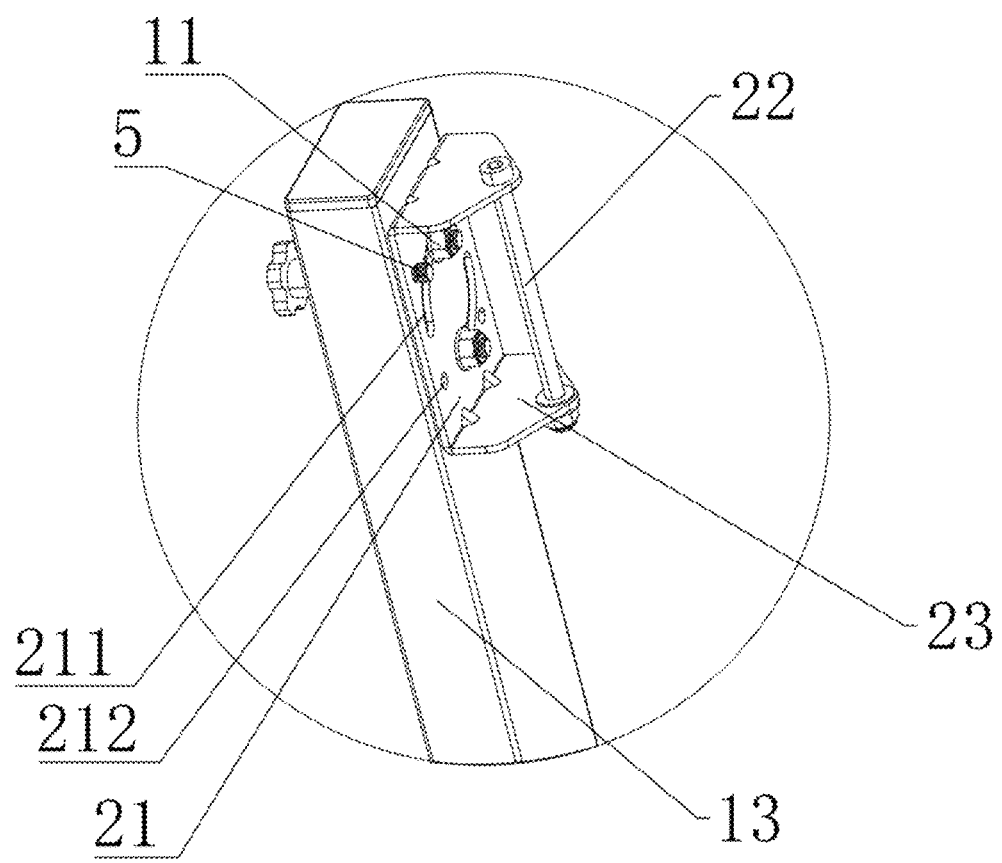
FIG. 4 is a schematic diagram of an exploded structure FIG. 3 at A.

In the present embodiment, as shown in FIGS. 3 to 4, the connecting base 21 is provided with two arc-shaped slots 211, and the two arc-shaped slots 211 are arranged opposite to each other, the connector 11 of the arc-shaped slot 211 on the upper side is arranged on the rightmost side of the arc-shaped slot 211, and the connector 11 of the arc-shaped slot 211 on the lower side is arranged on the leftmost side of the arc-shaped slot 211, so that the connecting seat 21 can rotate clockwise only when initially rotated, and the arc-shaped slot 211 thus arranged enables the connecting seat 21 to rotate ninety degrees at most, thus changing the audiovisual device from a horizontal screen to a vertical screen, and the arc-shaped slot 211 can be lengthened according to actual requirements so as to increase an angle of rotation of the audiovisual device; and the rotary rod 22 is arranged between two fixing plates 23 of the connecting seat 21, the upper and lower ends of the vertical plate of the connecting plate 611 are respectively provided with the fixing plate 23, the mounting plate 3 is connected to the rotary rod 22, and the mounting plate 3 is used to mount the audiovisual device, rotate the audiovisual device, drive the rotary rod 22 and the mounting plate 3 to offset relative to the column 1, so that the angles of the two sides of the audiovisual device are changed, and viewers at the sides can more conveniently watch the content on the audiovisual device.

Further, as a preferred embodiment, the connecting seat 21 is provided with at least one first connecting hole 212, and the column 1 is provided with a second connecting hole, a fixture 5 is provided in the second connecting hole, and the fixture 5 passes through the first connecting hole 212 and the second connecting hole respectively to detachably connect the connecting seat 21 with the column 1. In the present embodiment, the connecting seat 21 is provided with four first connecting holes 212, the column 1 is correspondingly provided with four second connecting holes, and four fixtures 5 are arranged correspondingly; and the fixtures 5 are bolts 8, and the first connecting holes 212 and the second connecting holes are threaded holes. When it is necessary to switch between horizontal or vertical screens of the audiovisual device, the bolts 8 are released from the first connecting holes 212 and the second connecting holes, then the connecting seat 21 is rotated, and then the bolts 8 are screwed into the first connecting holes 212 and the second connecting holes to fix the connecting seat 21 with the column 1 to prevent the connecting seat 21 from rotating.

Figure 5:
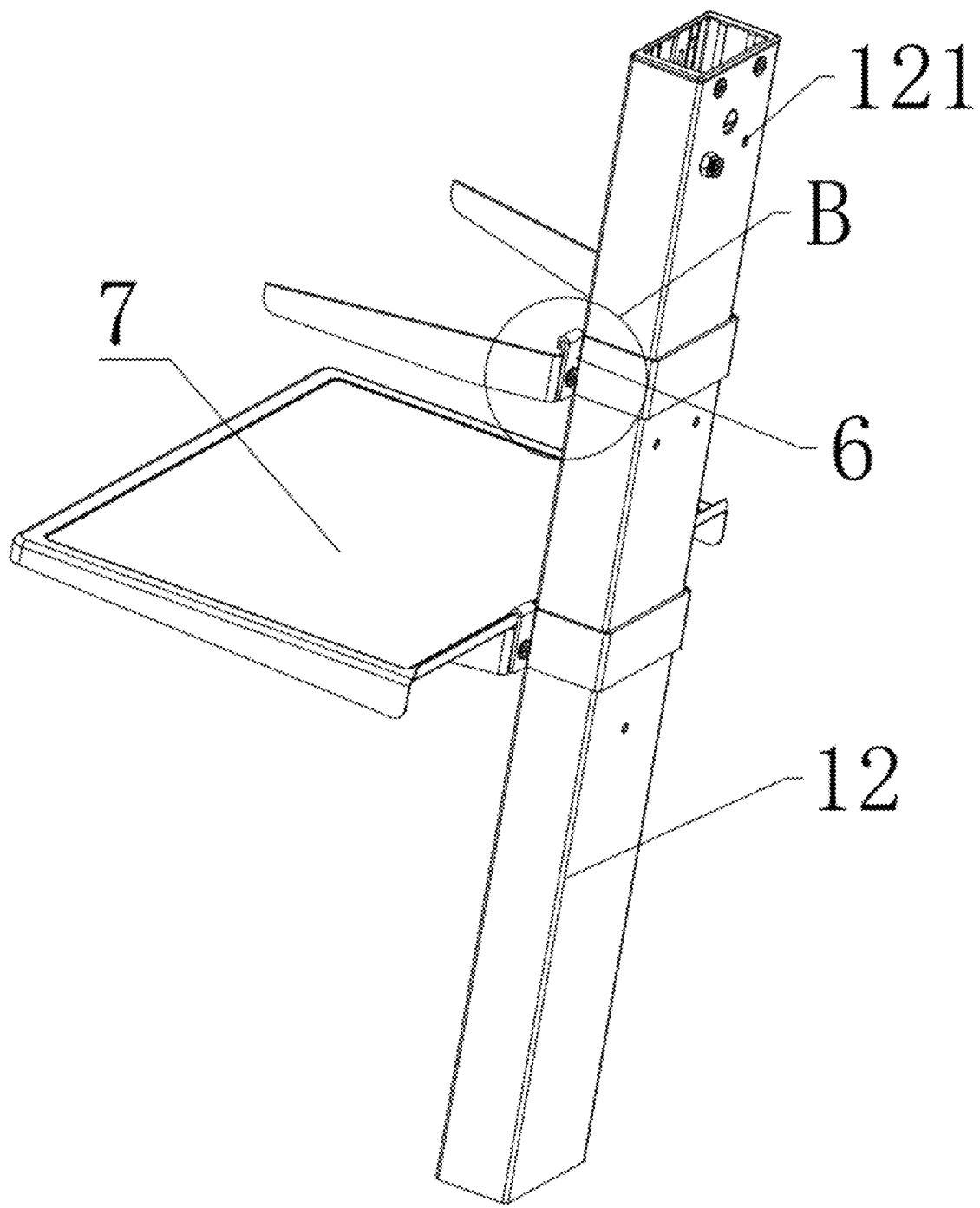
FIG. 5 is a structural schematic diagram of a clamping member in FIG. 2.
Figure 6:
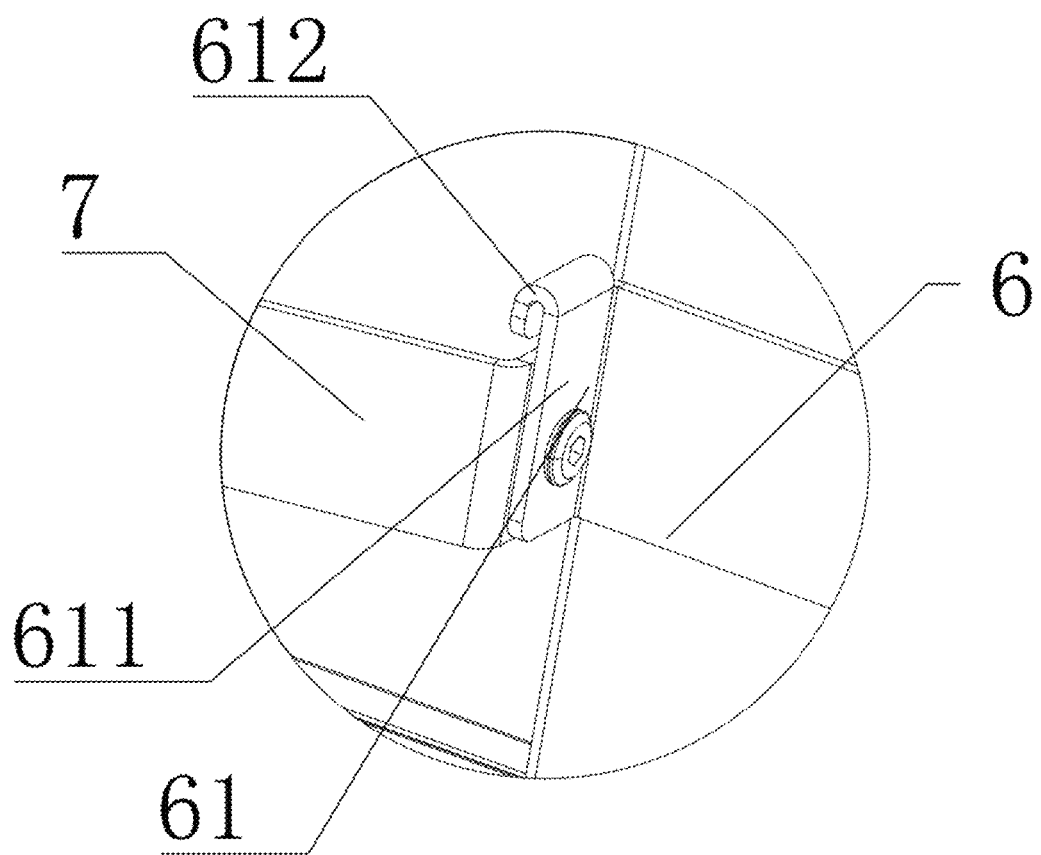
FIG. 6 is a schematic diagram of an exploded structure of FIG. 5 at B.
Figure 7:
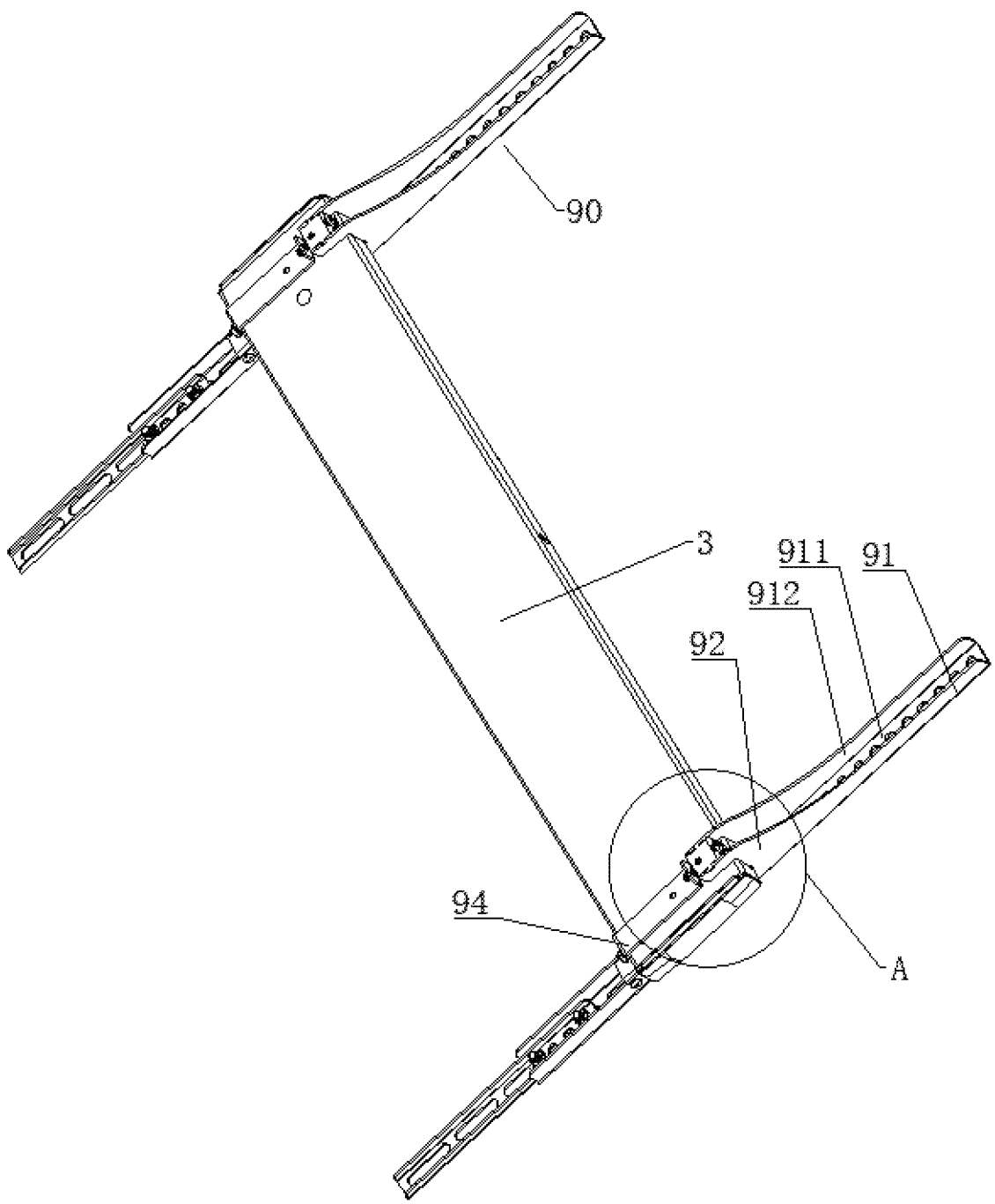
FIG. 7 is a schematic diagram of a hook matching structure in the embodiment of FIG. 1.
Figure 8:
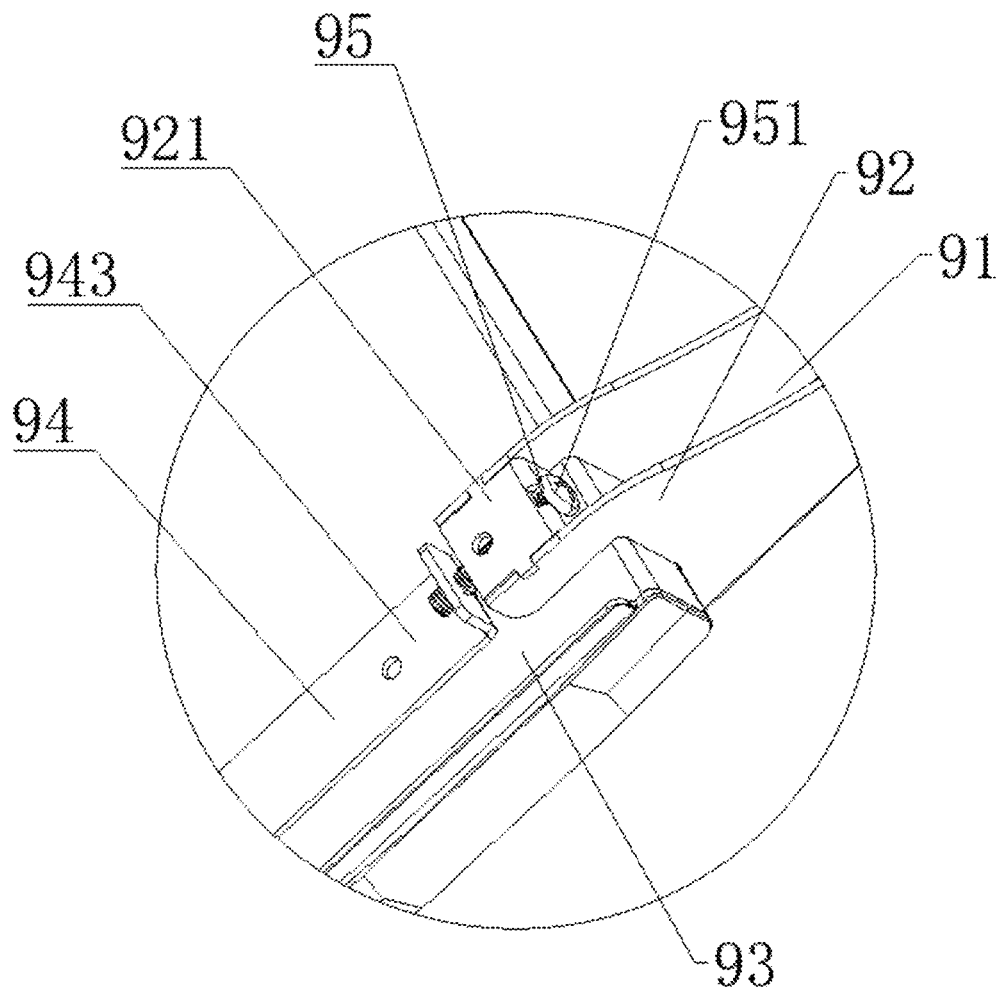
FIG. 8 is a schematic diagram of an exploded structure of FIG. 7 at C.
Figure 9:
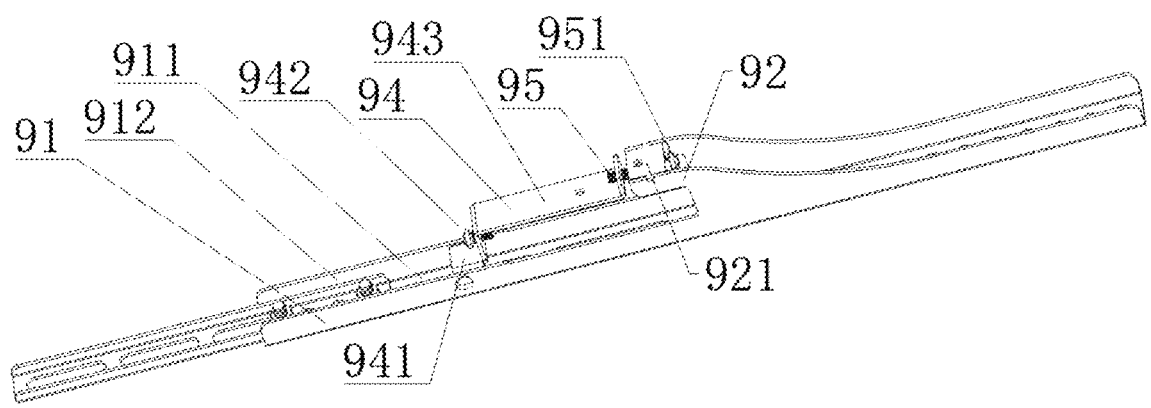
FIG. 9 is a schematic diagram of a first structure of FIG. 7 with the mounting plate removed.
Figure 10:
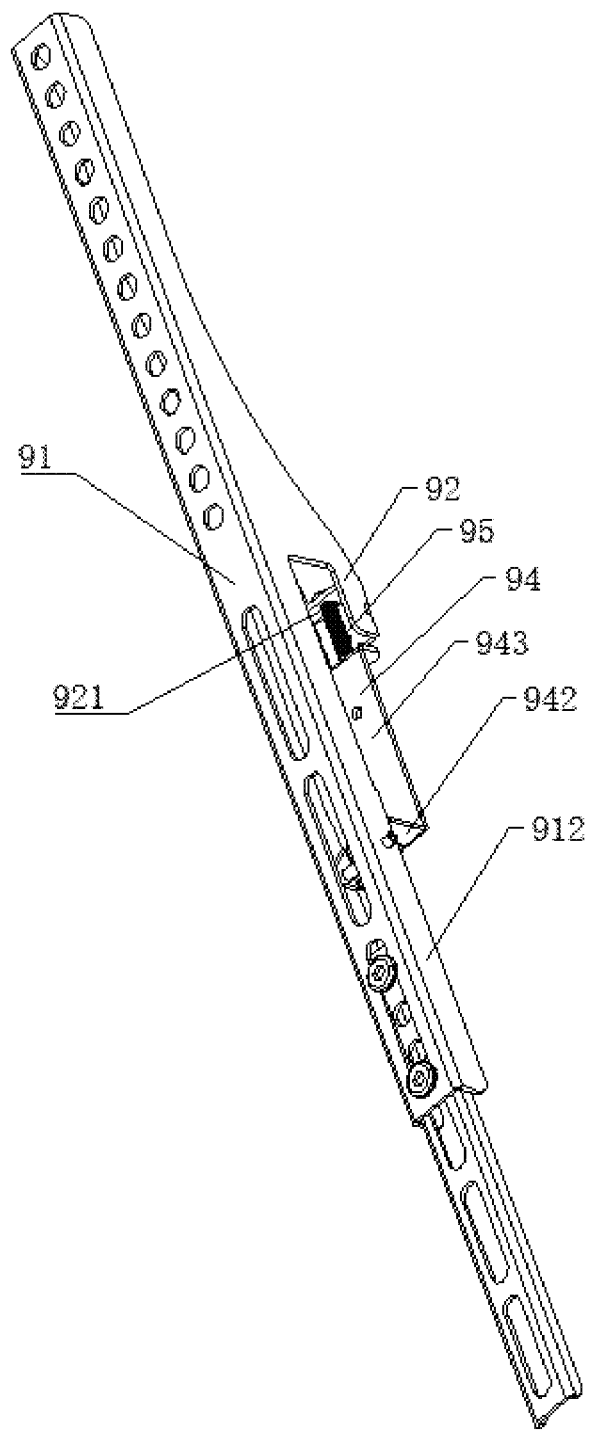
FIG. 10 is a schematic diagram of a second structure of FIG. 7 with the mounting plate removed.
Figure 11:
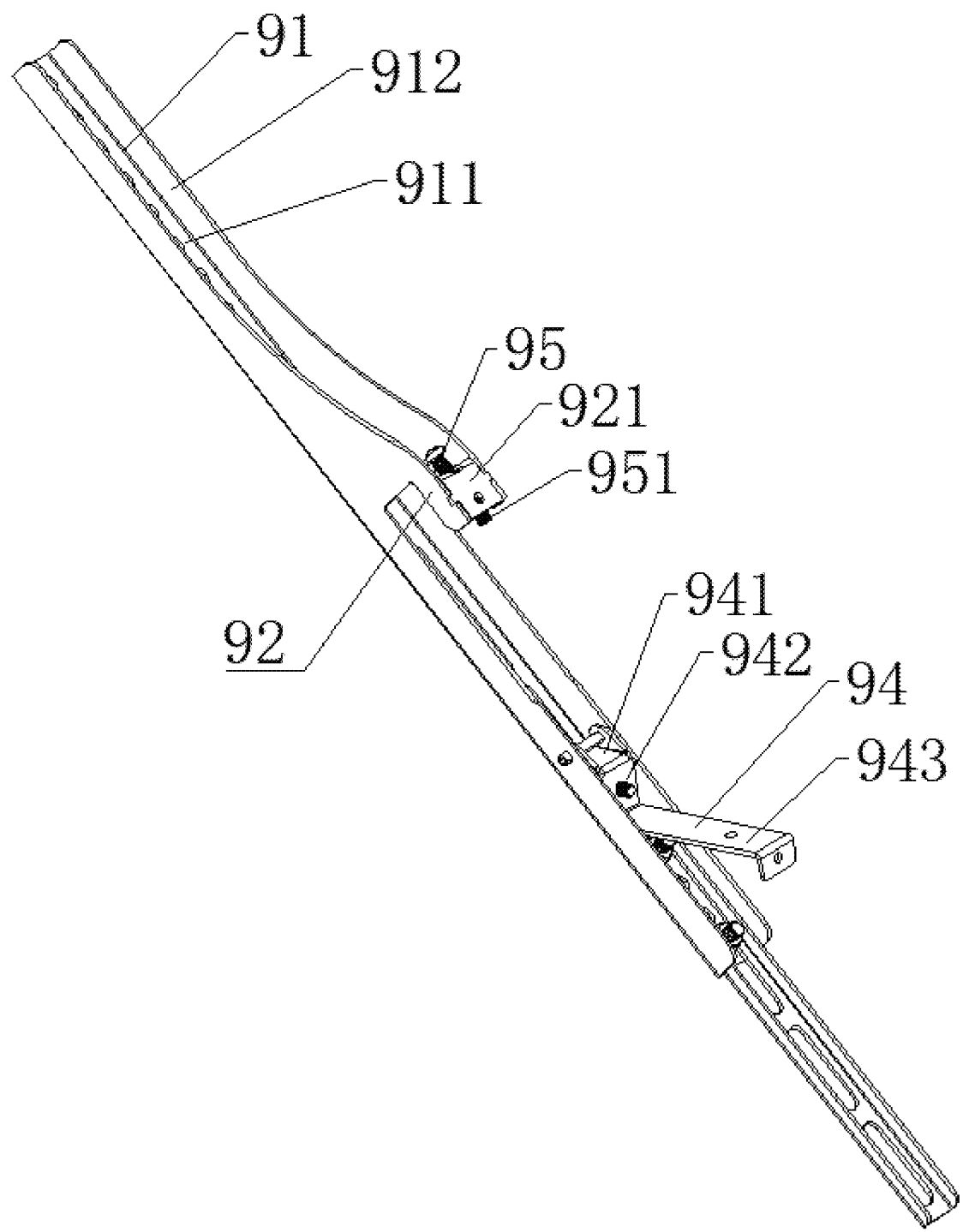
FIG. 11 is a structural schematic view of FIG. 10 in an open position from another perspective.

As shown in FIGS. 5-6, further, as a preferred embodiment, the column 1 is provided with a plurality of clamping members 6, the clamping members 6 are clamped on a rear end and both sides of the column 1; and the clamping members 6 are provided with snap-fit members 61 on both sides of a front end thereof, and the snap-fit members 61 are respectively provided with a placement table 7 on a front end thereof. The snap-fit members 61 respectively comprise a connecting plate 611 and a U-shaped clip 612, the clamping member 6 is provided with the connecting plate 611 on both sides of the front end thereof, an upper end of the connecting plate 611 is provided with the U-shaped clip 612, the U-shaped clip 612 is clamped to one side of the placement table 7, and the connecting plate 611 is detachably connected with the placement table 7.

In the present embodiment, two placement tables 7 are arranged, two clamping members 6 are correspondingly arranged, and four snap-fit members 61 are correspondingly arranged; the placement table 7 was previously mounted by two persons with one person holding the placement table 7 and the other person fixing the placement table 7 and the column 1 via screws; by contrast, when the placement tables 7 of the audiovisual device rack are mounted, the snap-fit members 61 can initially clamp the placement tables 7, and then edges of the placement tables 7 are clamped in the U-shaped clip 612, and then the connecting plate 611 is connected with the placement tables 7 via screws, so that the placement tables 7 are connected to the column 1.

Further, as a preferred embodiment, the column 1 comprises a first column body 12 and a second column body 13, the first column body 12 is provided with a telescopic cavity, the telescopic cavity is movably provided with the second column body 13 therein, a lower end of the first column body 12 is provided with a base 4, and the adjusting member 2 is arranged on the second column body 13. The first column 12 is provided with a third connecting hole 121, the second column body 13 is provided with a plurality of fourth connecting holes 131 equally spaced along a length direction thereof, the third connecting hole 121 is provided with a bolt 8 therein, and the bolt 8 passes through the third connecting hole 121 and the fourth connecting holes 131 to connect the first column body 12 with the second column body 13. That the second column body 13 is telescopic means that the overall height of the column 1 can be adjusted on the first column body 12, thus further facilitating users to use.

As shown in FIGS. 7 to 11, an audiovisual device hook fixing structure comprises a fixing rod 91 for fixedly connecting to an mounting plate 3, the fixing rod 91 is provided with a device connection portion for fixing an audiovisual device (e.g., a television) thereto, the fixing rod 91 is further provided with a limiting portion 94, one end of the limiting portion 94 (i.e., a first end of the limiting portion 94) is hinged to the fixing rod 91, and the other end of the limiting portion 94 (i.e., a second end of the limiting portion 94) is in snap fit with or separated from a snap-on portion 92 of the fixing rod 91; one end of the limiting portion 94 (e.g., the second end of the limiting portion 94) in snap fit with or separated from the fixing rod 91 is in snap fit with the snap-on portion 92 so as to form a snap-in cavity therebetween, the snap-in cavity is used for the mounting plate 3 to be snapped therein so that the fixing rod 91 is fixedly connected to the mounting plate 3, and the end of the limiting portion 94 in snap fit with or separated from the fixing rod 91 is separated from the snap-on portion 92 to open the snap-in cavity for the fixing rod 91 to be released; and the end of the limiting portion 94 in snap fit with or separated from the fixing rod 91 is in snap fit with or separated from the snap-on portion 92 on two adjacent surfaces of the mounting plate 3 or at an abutting rib of the two surfaces, that is, they are in snap fit with or separated from each other at one of the adjacent surfaces of the mounting plate 3 or at an abutting rib of the two surfaces.

In the present embodiment, the device connection portion is a plurality of mounting holes, and the mounting holes are used for mounting the audiovisual device; two inner top corners of an upper end of the snap-in cavity are rounded and chamfered with the corresponding edges of the mounting plate 3; the limiting portion 94 and the snap-on portion 92 of the fixing rod 91 are buckled together so that the hook fixing structure is connected with the mounting plate 3, and then the audiovisual device is fixed to the device connection portions to fix the audiovisual device, so as to enhance the safety of the product, connect the audiovisual device more stably, and prevent movement due to external forces.

Further, as a preferred embodiment, the snap-on portion 92 comprises a first snap-on portion and a second snap-on portion, the second snap-on portion is arranged toward the limiting portion 94 from the first snap-on portion to form a bayonet structure on the snap-on portion 92. Through the bayonet structure, the fixing rod 91 can be snapped to the top surface of the mounting plate 3 even when it is not fastened by the limiting portion 94, so that the fixing rod 91 can be initially positioned and assembled and will not fall off easily, thus decreasing the mounting difficulty of the fixing rod 91.

Further, as a preferred embodiment, the fixing rod 91 comprises a fixing surface 911 and bending portions 912 bent in a same direction along both sides of the fixing surface 911, the device connection portion is arranged on the fixing surface 911, and the snap-on portion 92 is formed on the bending portion 912. The end of the limiting portion 94 in snap fit with or separated from the fixing rod 91 is connected with the second snap-on portion of the snap-on portion 92 by a snap, screw connection or connecting pin. The use of clamping for fixing makes the connection stabler.

Further, as a preferred embodiment, the snap-in cavity is rectangular in shape, the limiting portion 94 comprises an hinged portion 941 and a connecting portion 942, the hinged portion 941 is arranged between the two bending portions 912, the hinged portion 941 is hinged with the fixing surface 911 by means of an articulated shaft, and one side of the hinged portion 941 is provided with the connecting portion 942 detachably connected with the mounting plate 3. The hinged portion 941 can be opened relative to the fixing surface 911 to clamp the mounting plate 3 when not opened and to remove the hook fixing structure from the mounting plate 3 when opened; and the connecting portion 942 initially connects the limiting portion 94 with the mounting plate 3. The snap-on portion 92 is provided with a mounting member 921, the mounting member 921 is connected with the limiting portion 94 by means of a connecting structure 95; an upper end of the connecting portion 942 is provided with a clamping portion 943, and the clamping portion 943, the connecting portion 942 and the hinged portion 941 are integrally arranged. The mounting member 921 is connected with the clamping portion 943 to clamp the mounting plate 3 in place, making the connection stabler without rocking and without movement due to external forces.

In the present embodiment, the connection structure 95 comprises a screw 951, the mounting member 921 is provided with a first screw hole, and the clamping portion 943 is provided with a second screw hole. The screw 951 passes through the first screw hole and the second screw hole respectively to connect the snap-on portion 92 with the limiting portion 94 so as to clamp the mounting plate 3 in place.

In the audiovisual device rack of the present embodiment, a hook 90 is mounted by clamping on both sides of the mounting plate 3 above the column 1 respectively, and the hooks 90 are fixedly connected to the mounting plate 3 via the hook fixing structure, so that the audiovisual device (e.g., a TV) can be mounted on the hooks 90, and then the hooks 90 are fixedly connected to the mounting plate 3 via the hook fixing structure to fix the audiovisual device.

Although the present invention has been described with reference to the foregoing preferred embodiments, it should be noted that those of ordinary skill in the art can make a plurality of improvements and modifications without departing from the principles of the present invention, and such modifications and modifications shall be construed to fall into the scope of the present invention.

What is claimed is:

1. An audiovisual device rack, comprising a column, an adjusting member and a mounting plate, wherein the mounting plate is connected to the column via the adjusting member, the adjusting member comprises a connecting seat and two fixing plates respectively formed on one side and the opposite side of the connecting seat, the connecting seat is provided with a plurality of arc-shaped slots, the column is provided with connectors, the connectors pass through the arc-shaped slots to be connected with the column so as to connect the connecting seat with the column, the mounting plate is arranged between the two fixing plates and is hingedly fixed to the adjusting member by a rotary rod connected between the two fixing plates, the adjusting member is rotatably arranged around a center of a circle of the arc-shaped slots relative to the column, and the mounting plate is rotatably arranged relative to the adjusting member with the rotary rod as a rotation axis.

2. The audiovisual device rack according to claim 1, wherein the connecting seat is provided with at least one first connecting hole, and the column is provided with a second connecting hole, a fixture is provided in the second connecting hole, and the fixture passes through the first connecting hole and the second connecting hole respectively to detachably connect the connecting seat with the column.

3. The audiovisual device rack according to claim 1, wherein the column is provided with a plurality of clamping members, the clamping members are clamped on a rear end and both sides of the column; and the clamping members are provided with snap-fit members on both sides of a front end thereof, and the snap-fit members are respectively provided with a placement table on a front end thereof.

4. The audiovisual device rack according to claim 3, wherein the snap-fit members respectively comprise a connecting plate and a U-shaped clip, the U-shaped clip is clamped to one side of the placement table, and the connecting plate is detachably connected with the placement table.

5. The audiovisual device rack according to claim 1, wherein the column comprises a first column body and a second column body, the first column body is provided with a telescopic cavity, the telescopic cavity is movably provided with the second column body therein, a lower end of the first column body is provided with a base, and the adjusting member is arranged on the second column body.

6. The audiovisual device rack according to claim 5, wherein the first column is provided with a third connecting hole, the second column body is provided with a plurality of fourth connecting holes equally spaced along a length direction thereof, the third connecting hole is provided with a bolt therein, and the bolt passes through the third connecting hole and the fourth connecting holes to connect the first column body with the second column body.

7. The audiovisual device rack according to claim 1, wherein the audiovisual device rack further comprises a hook, the hook is fixedly connected to a fixing rod on the mounting plate by means of a hook fixing structure, and the fixing rod is provided with a device connection portion for fixing an audiovisual device thereto,
the fixing rod is further provided with a limiting portion, and the limiting portion is hinged to the fixing rod at one end; the limiting portion is in snap fit with or separated from a snap-on portion of the fixing rod at the other end; the end of the limiting portion in snap fit with or separated from the fixing rod is in snap fit with the snap-on portion to form a snap-in cavity therebetween, the snap-in cavity is used for the mounting plate to be snapped therein so that the fixing rod is fixedly connected to the mounting plate, and the end of the limiting portion in snap fit with or separated from the fixing rod is separated from the snap-on portion to open the snap-in cavity for the fixing rod to be released; and
wherein the end of the limiting portion in snap fit with or separated from the fixing rod is in snap fit with or separated from the snap-on portion on two adjacent surfaces of the mounting plate or at an abutting rib of the two surfaces.

8. The audiovisual device rack according to claim 7, wherein the snap-on portion comprises a first snap-on portion and a second snap-on portion, the second snap-on portion is arranged toward the limiting portion from the first snap-on portion to form a bayonet structure on the snap-on portion.

9. The audiovisual device rack according to claim 8, wherein the end of the limiting portion in snap fit with or separated from the fixing rod is connected with the snap-on portion by a snap, screw connection or connecting pin; and
the fixing rod comprises a fixing surface and bending portions bent in a same direction along both sides of the fixing surface, the device connection portion is arranged on the fixing surface, and the snap-on portion is formed on the bending portion.

10. The audiovisual device rack according to claim 9, wherein the snap-in cavity is rectangular in shape, the limiting portion comprises an hinged portion and a connecting portion, the hinged portion is arranged between the two bending portions, the hinged portion is hinged with the fixing surface by means of an articulated shaft, and one side of the hinged portion is provided with the connecting portion detachably connected with the mounting plate.

11. The audiovisual device rack according to claim 10, wherein the snap-on portion is provided with a mounting member, the mounting member is connected with the limiting portion by means of a connecting structure; an upper end of the connecting portion is provided with a clamping portion, and the clamping portion, the connecting portion and the hinged portion are integrally arranged.

12. An audiovisual device rack, comprising:
a base;
a column having a lower end connected with the base;
a mounting plate connected to the column; and
a hook fixedly connected to a fixing rod on the mounting plate by means of a hook fixing structure, the fixing rod being provided with a device connection portion for an audiovisual device to be fixed thereto;
wherein the fixing rod is further provided with a limiting portion, and the limiting portion is hinged to the fixing rod at one end; the limiting portion is in snap fit with or separated from a snap-on portion of the fixing rod at the other end; the end of the limiting portion in snap fit with or separated from the fixing rod is in snap fit with the snap-on portion to form a snap-in cavity therebetween, the snap-in cavity is used for the mounting plate to be snapped therein so that the fixing rod is fixedly connected to the mounting plate, and the end of the limiting portion in snap fit with or separated from the fixing rod is separated from the snap-on portion to open the snap-in cavity for the fixing rod to be released; and
wherein the end of the limiting portion in snap fit with or separated from the fixing rod is in snap fit with or separated from the snap-on portion on two adjacent surfaces of the mounting plate or at an abutting rib of the two surfaces.

* * * * *